(No Model.)
9 Sheets—Sheet 1
C. W. RASMUSEN.
CABLE RAILWAY APPARATUS.
No. 290,708.
Patented Dec. 25, 1883.
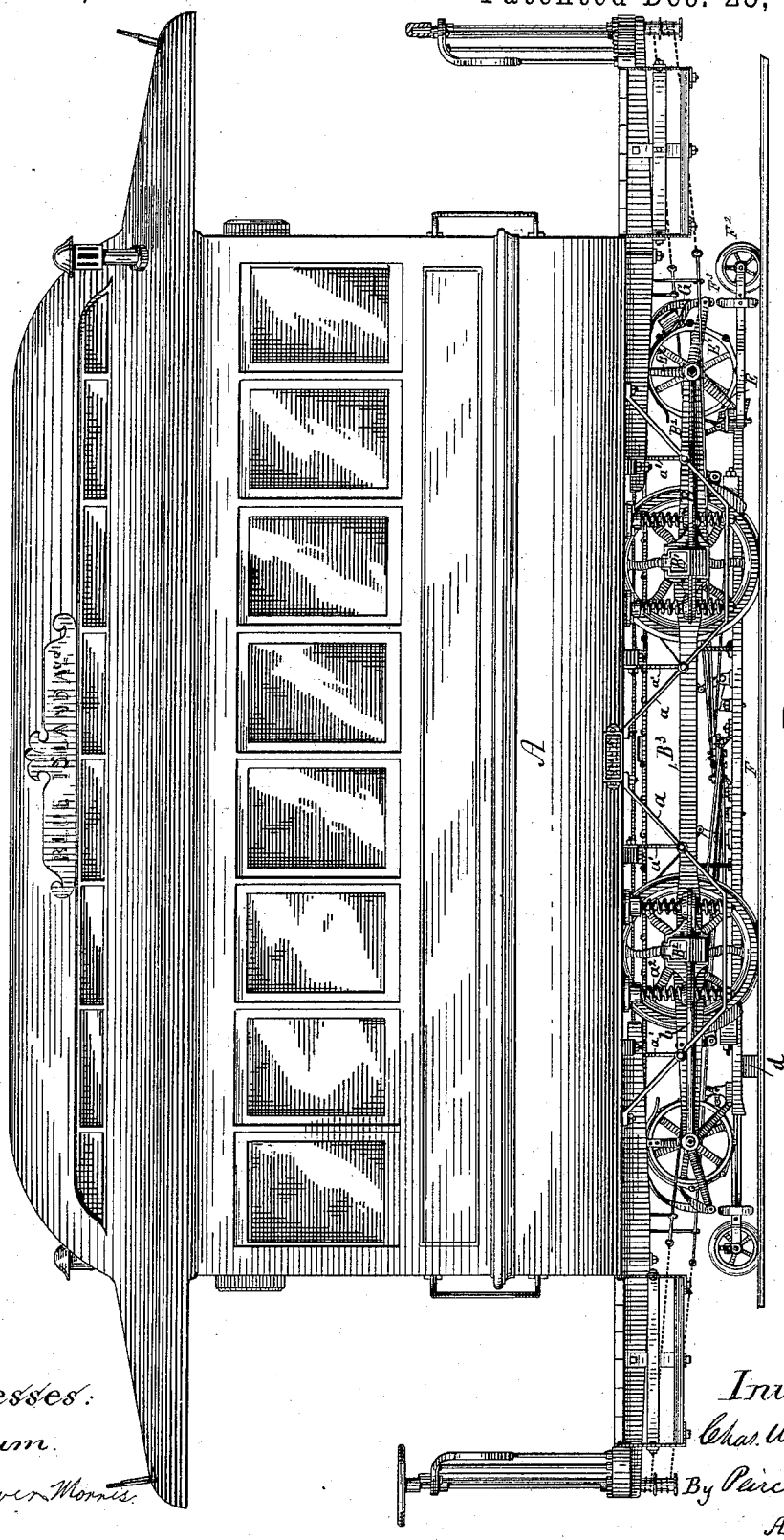
Witnesses:
J. Lorum
J. Oliver Morris
Inventor:
Chas. W. Rasmusen
By Pairce & Fisher
Attorneys.

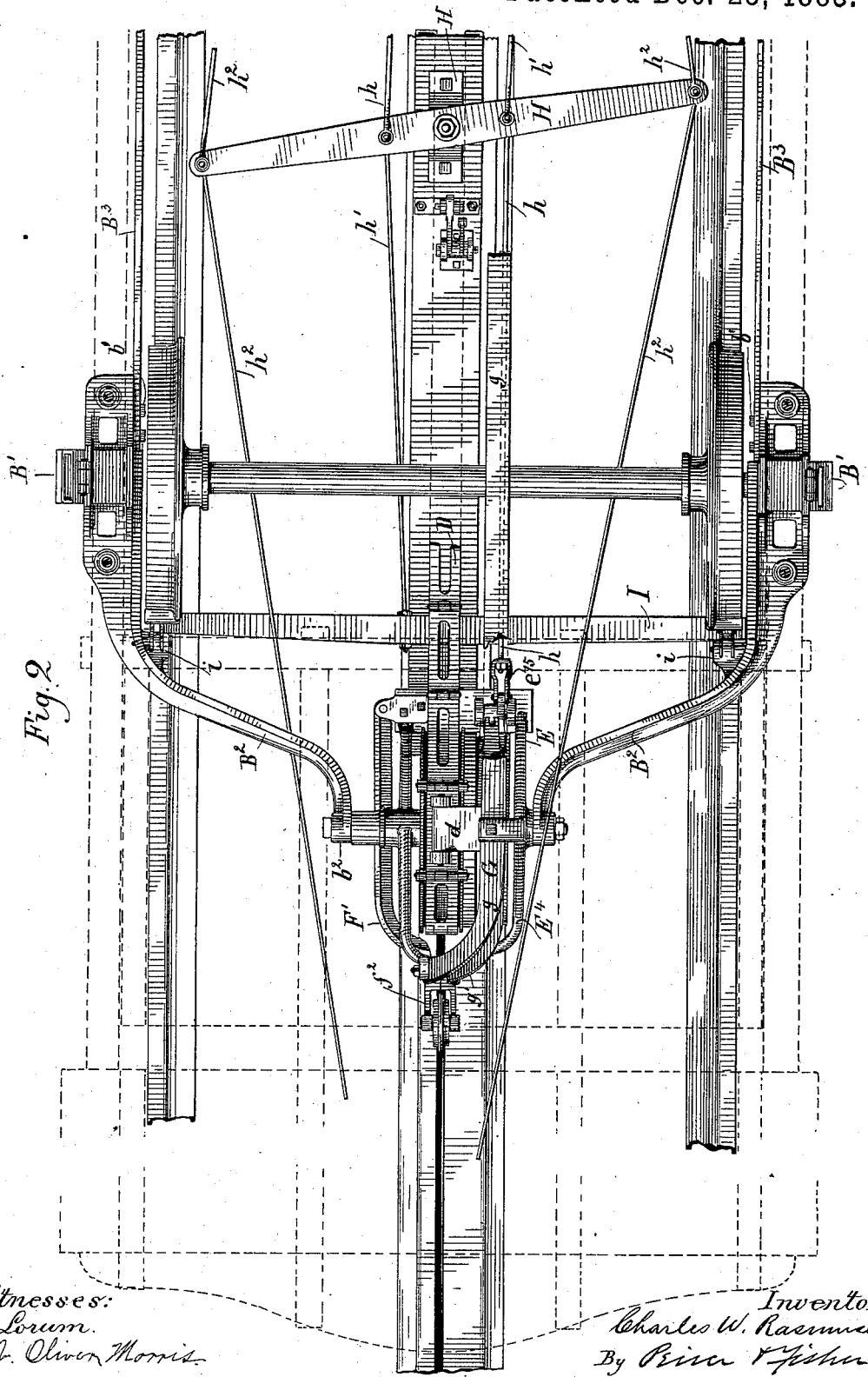

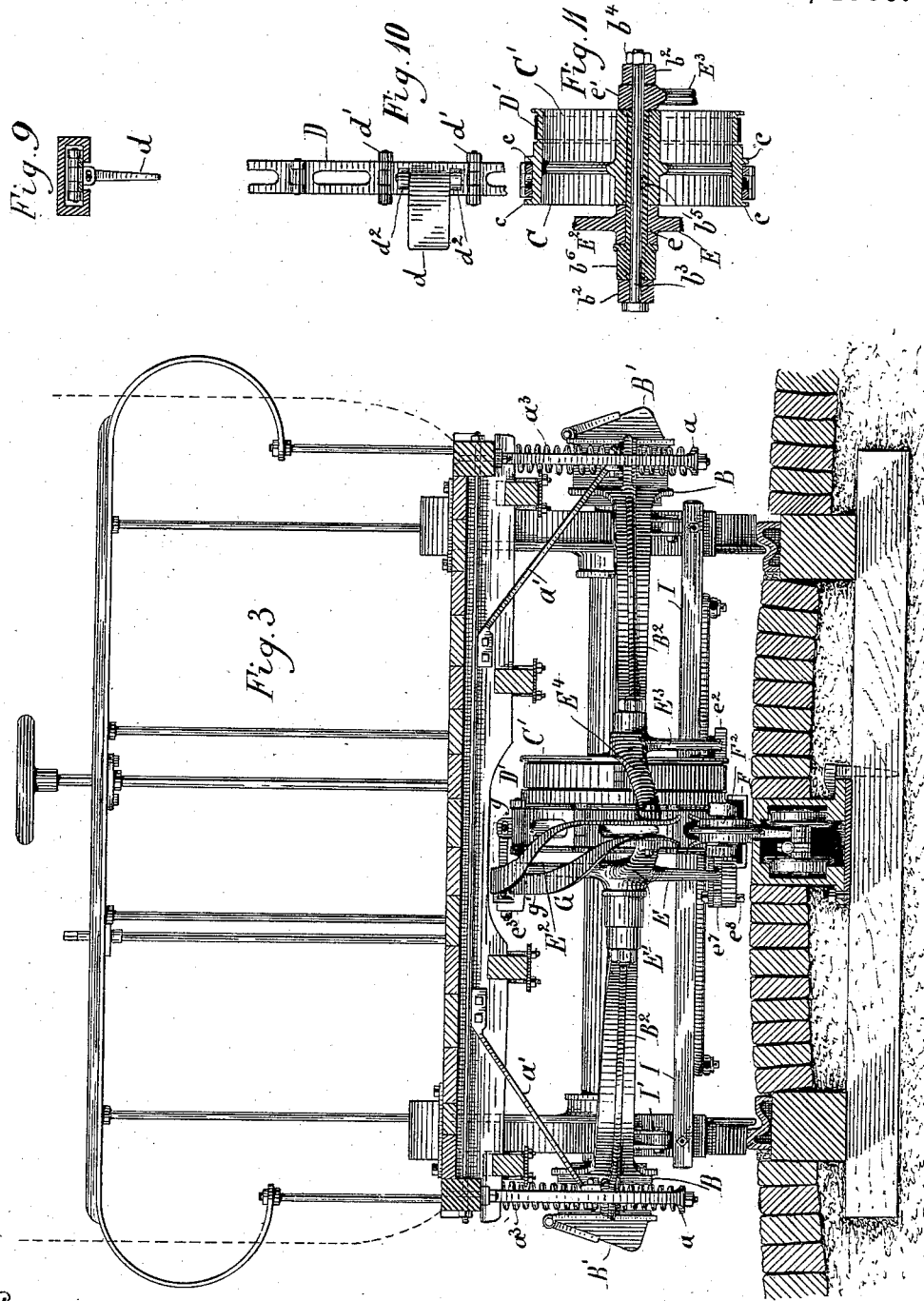

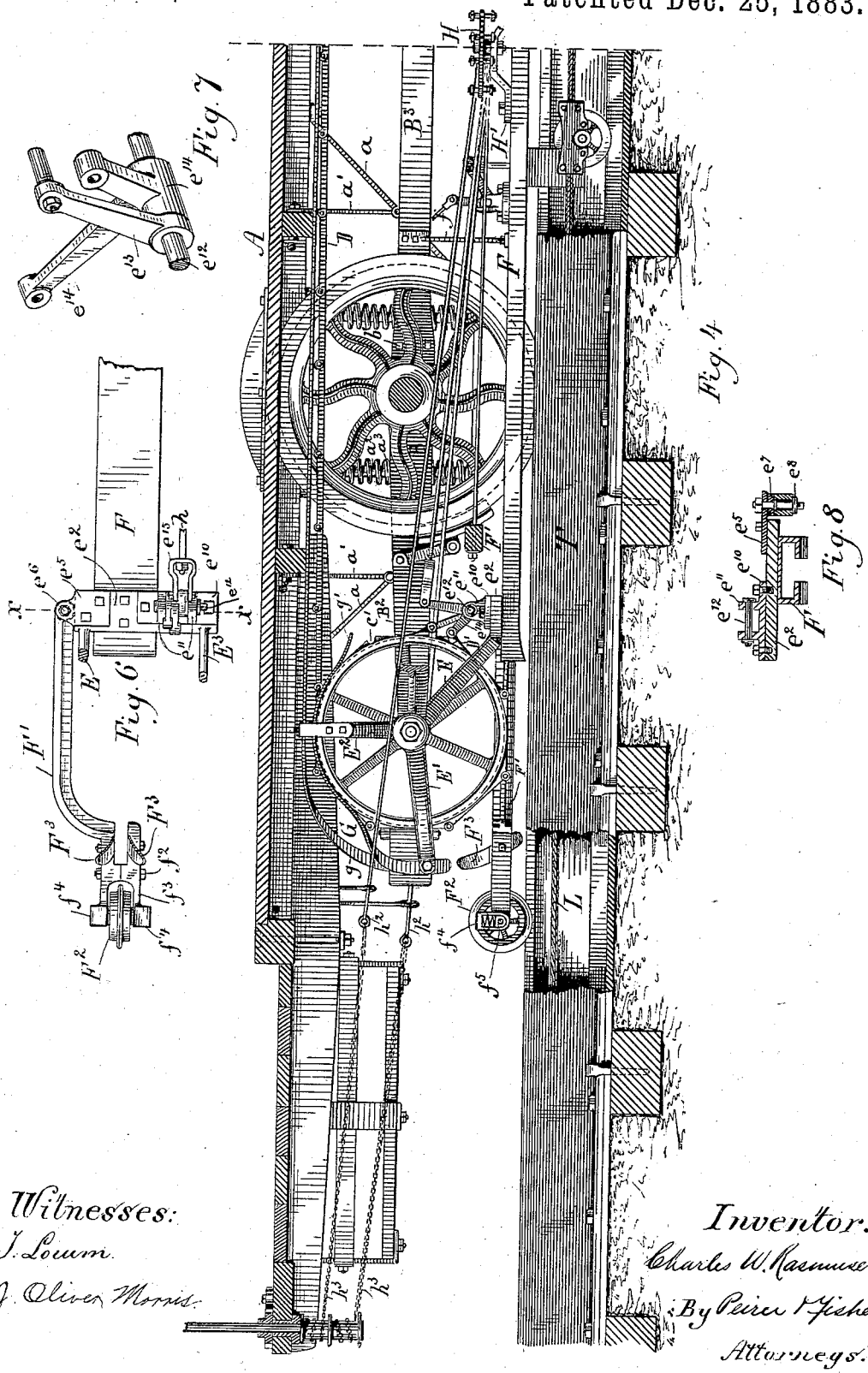

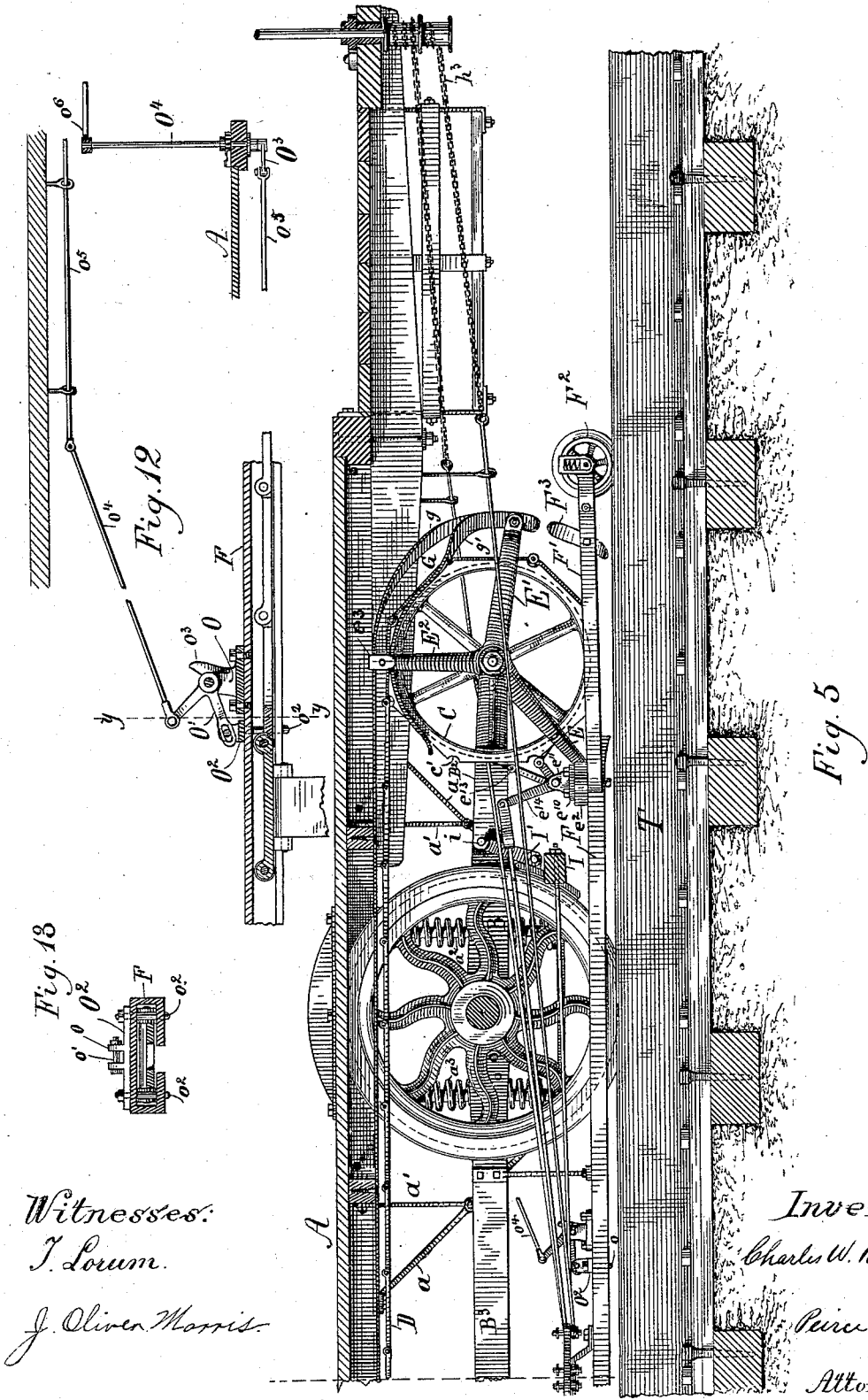

(No Model.) 9 Sheets—Sheet 6.
C. W. RASMUSEN.
CABLE RAILWAY APPARATUS.
No. 290,708. Patented Dec. 25, 1883.
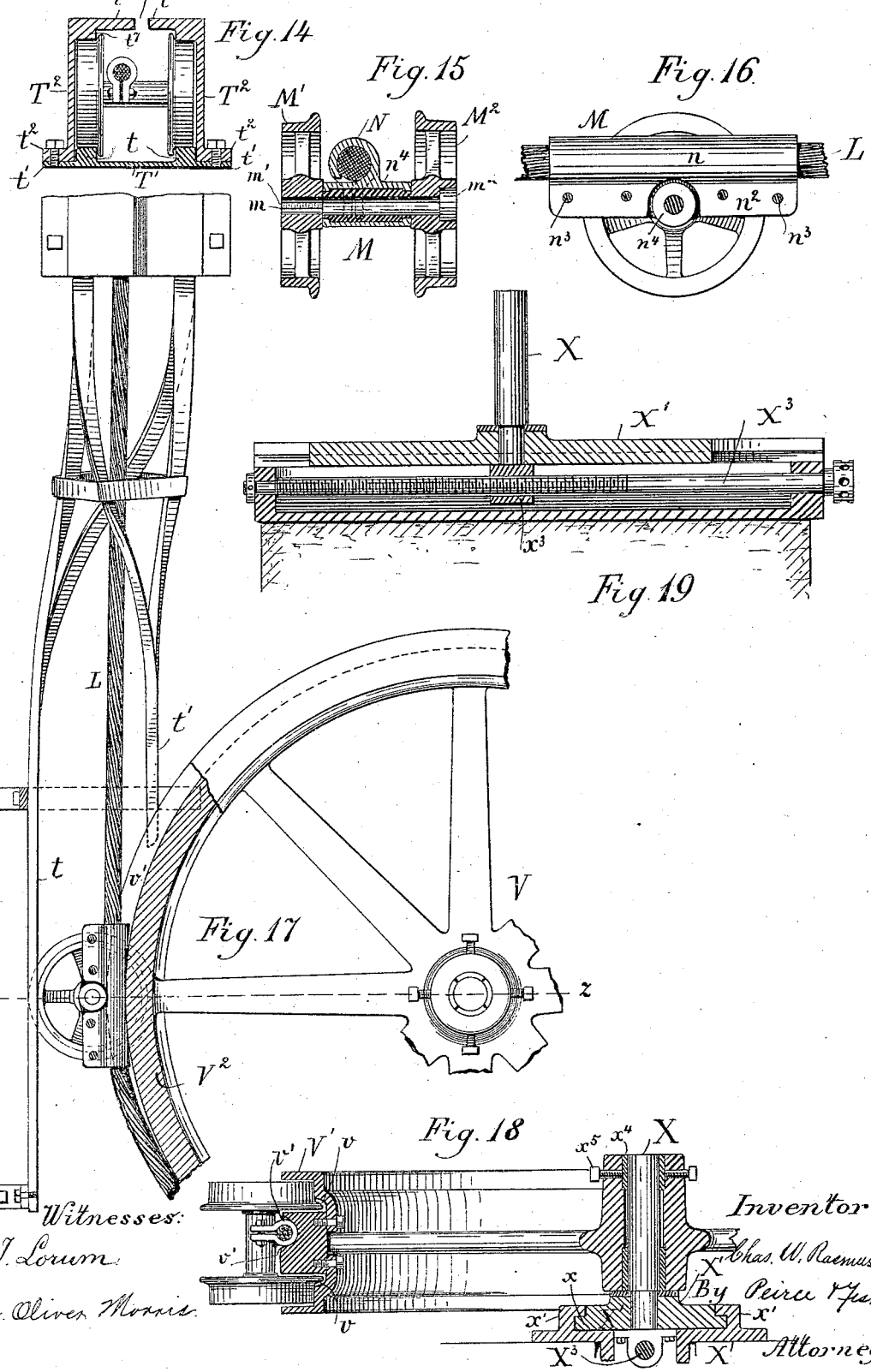

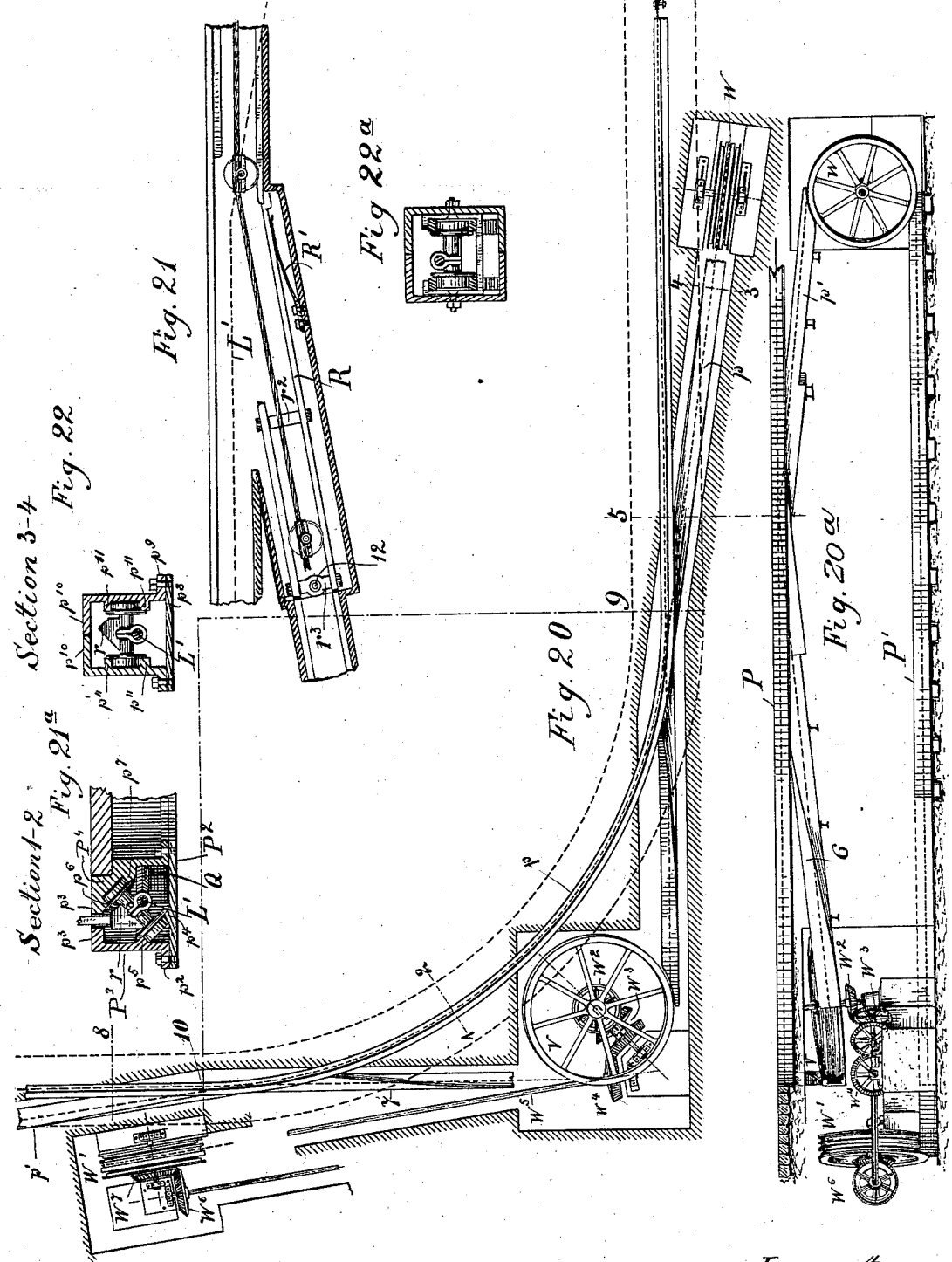

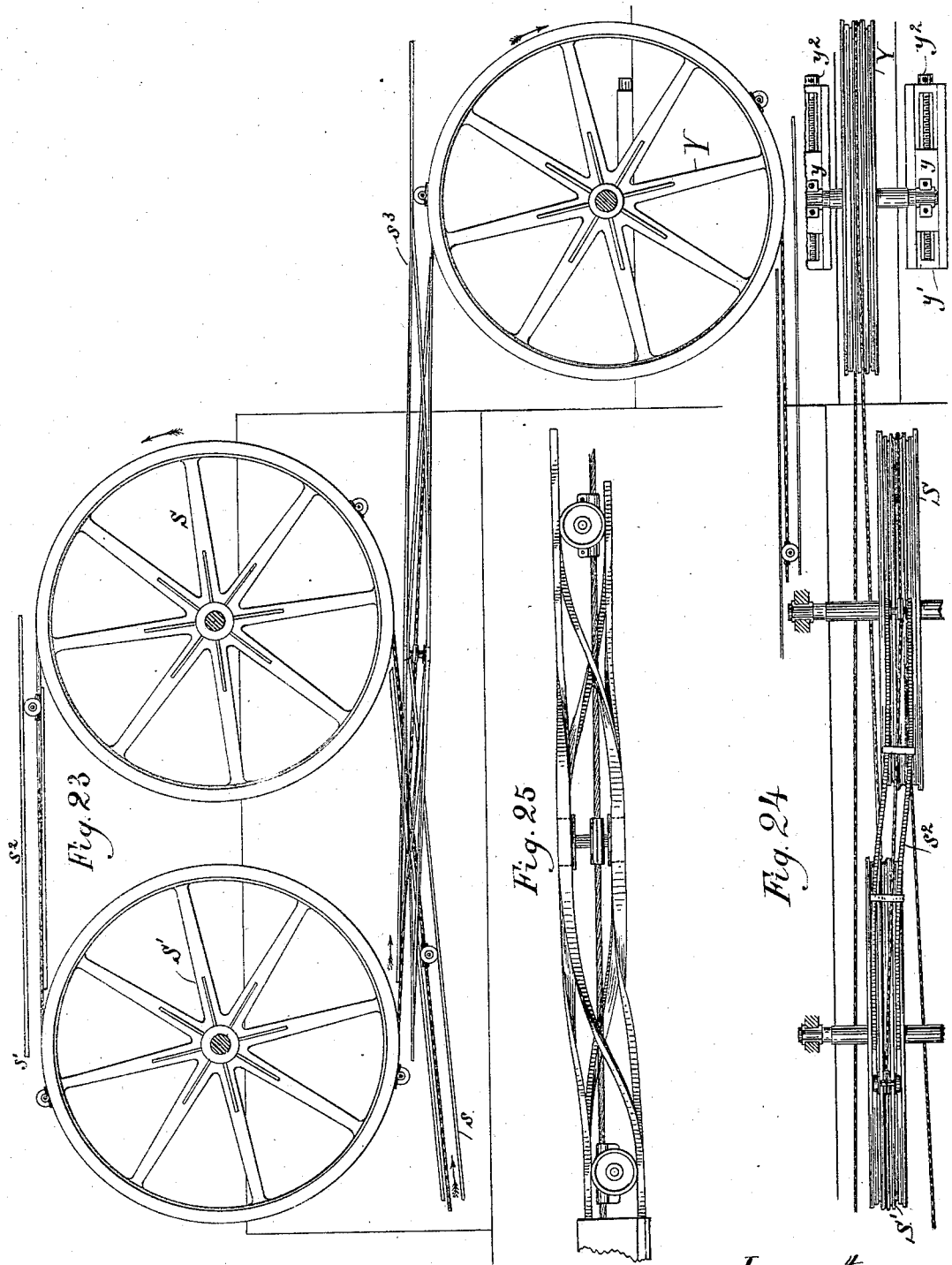

(No Model.) 9 Sheets—Sheet 9.
C. W. RASMUSEN.
CABLE RAILWAY APPARATUS.
No. 290,708. Patented Dec. 25, 1883.
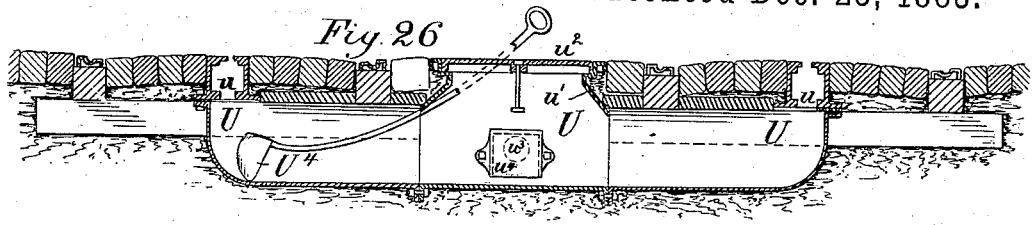
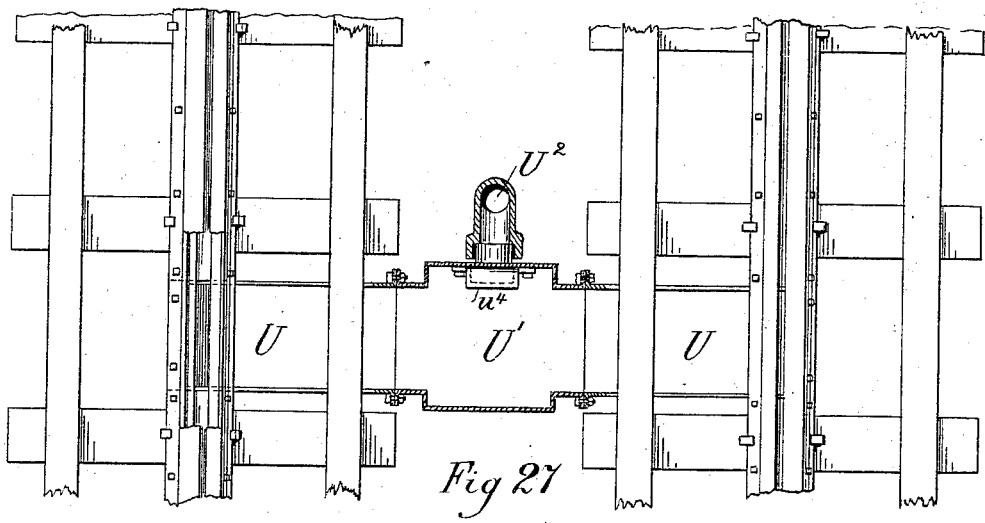
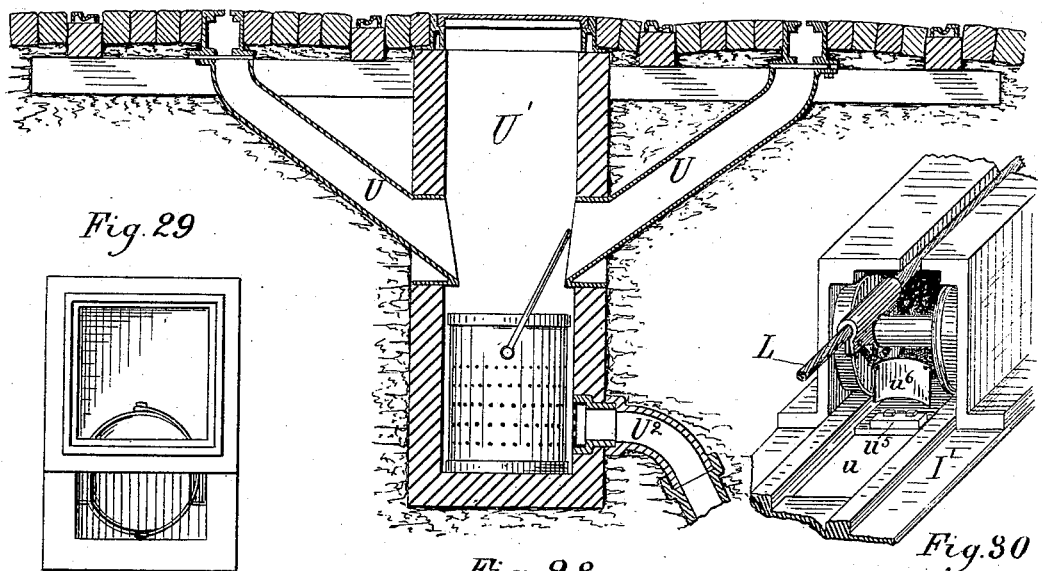
Witnesses:
J. Lorum.
J. Oliver Morris.
Inventor:
Charles W. Rasmusen
By Peirce & Fisher
Attorneys.

United States Patent Office.

CHARLES W. RASMUSEN, OF CHICAGO, ILLINOIS.

CABLE-RAILWAY APPARATUS.

SPECIFICATION forming part of Letters Patent No. 290,708, dated December 25, 1883.

Application filed March 21, 1883. (No model.)

*To all whom it may concern:*

Be it known that I, CHARLES W. RASMUSEN, a citizen of the United States, residing at Chicago, in the county of Cook and State of Illinois, have invented certain new and useful Improvements in Cable-Railway Apparatus, of which the following is a specification.

My present invention has relation to the improvement of the apparatus of railways the cars of which are propelled by means of an endless cable traveling within a tube or tunnel placed between the rails, and in particular does it relate to the improvement of such apparatus as is used in cable-railway systems of the character set forth in a patent granted to me on the 31st day of October, 1882, and numbered 266,645, wherein the propulsion of the cars is effected by means of movable projecting arms carried upon an endless chain, and depending from the car to connect with stops or trucks placed at intervals along the traction-cable and supporting the same.

This invention has for its objects, first, to provide improved means for sustaining the drums of the endless-chain-carrying projecting arms, the mechanism for arresting the movement of said chain, the mechanism for guiding the projecting arms, and the brake-beams of the car; second, to improve in sundry details the construction of the endless chain and its projecting arms, and the sustaining-drums, guide mechanism, and friction-clutch; third, to provide mechanism whereby, when the car is traversing a curve, the projecting arm which is in the cable-tube may be located centrally of the car; fourth, to improve the cable-trucks and the clamps for attaching them to the cable; fifth, to improve the construction of the cable-tube; sixth, to furnish an improved form of wheel and arrangement of guide in connection therewith for changing the direction of travel of the cable; seventh, to provide improved apparatus for transferring the cars around abrupt curves in the roadway; eighth, to provide improved driving mechanism for communicating motion to the traction-cable; and, ninth, to furnish improved means for removing the dirt from the cable-tubes. These several objects of invention I have accomplished by the mechanism hereinafter described, illustrated in the accompanying drawings, and particularly defined in the claims at the end of this specification.

Figure 1 represents a view in side elevation of a cable-car embodying features of my invention. Fig. 2 is a plan view of one-half the mechanism beneath the car, parts being removed for better illustration, and the car-bottom being shown in dotted lines. Fig. 3 is an end view of the mechanism attached to the car, the car-bottom being shown in section. Fig. 4 is a view in side elevation (parts being shown in section) of one-half of the car-bottom and mechanism beneath the same. Fig. 5 is a view similar to Fig. 4, but taken from the opposite side. Fig. 6 is a detail plan view of the hinged guide and the lever for operating the friction-clutch. Fig. 7 is a detail perspective view of the clutch-operating lever. Fig. 8 is a sectional view on line $x\ x$ of Fig. 6. Fig. 9 is a view in cross-section of the lower fixed guide, showing the endless belt and a projecting arm therein. Fig. 10 is a detail plan view of a portion of the endless chain carrying a projecting arm, shown turned to one side. Fig. 11 is a view in vertical section of one of the sprocket-drums and the friction-hub connected thereto. Fig. 12 is a detail view, in longitudinal vertical section, of a portion of the lower fixed guide, showing connected therewith, and in side elevation, the mechanism for locating a projecting arm in the center of such guideway. Fig. 13 is a cross-sectional view on line $y\ y$ of Fig. 12. Fig. 14 is a cross-sectional view of the cable-tube, showing the cable and a truck therein. Fig. 15 is a cross-sectional view of a cable-truck. Fig. 16 is a view in side elevation of a cable-truck with one wheel removed. Fig. 17 is a plan view of a portion of the terminal drum, showing also the arrangement of the guide-rails leading thereto. Fig. 18 is a cross-sectional view on line $z\ z$ of Fig. 17. Fig. 19 is a view in vertical longitudinal section of mechanism for adjusting the terminal drum. Fig. 20 is a plan view, showing the arrangement of the main and supplemental cables, tubes, and wheels at an abrupt curve of the roadway. Fig. 20ª is a view in side elevation of curve apparatus. Fig. 21 is a detail sectional view, showing the arrangement of movable rails at intersection of tubes. Fig. 21ᵃ is a section on line 1 2 of Fig. 20. Fig. 22 is a section on line 3 4 of Fig. 20. Fig. 22ᵃ is a sectional view of part of the main-cable tube containing movable rails. Fig. 23 is a view in side elevation of the driving mechanism and the tension-drum. Fig. 24 is a plan view of the driving mechanism and tension-drum, parts being omitted. Fig. 25 is a detail plan view of the lower twisted guide-rails used in the driving mechanism. Fig. 26 is a view in vertical transverse section on line $x\ x$ of Fig. 27. Fig. 27 is a plan view, partly in transverse section, of the dirt-discharging apparatus. Fig. 28 is a view in vertical transverse section of a modified form of dirt-discharging apparatus. Fig. 29 is a detail plan view, with the lid removed, of the dirt trap or reservoir. Fig. 30 is a perspective view of a portion of the cable-tube, showing the dump-block and the dirt-opening in the bottom thereof.

In my former patent, to which reference is made for greater particularity of description, the band connected with the car and carrying the projecting arms was sustained by and passed around sprocket wheels or drums supported centrally upon the axles of the car-wheels. The mechanism by which such projecting arms were guided in passing beneath the car-floor and into the slot of the cable-tube, as well as the mechanism for arresting the movement of said arms, was also carried upon the car-axles. In my present invention an endless chain or belt provided with projecting arms for connection with the cable is used; but the drums or wheels over which said chain passes are sustained upon a frame supported by the journal-boxes of the car-axles. So, also, the mechanism for arresting the movement of the projecting arms, the mechanism for guiding such arms, and the brake-beams for stopping the car are borne by the same main frame which supports the drums or pulleys of the endless band or chain.

The general construction of the mechanism connected with the car for starting and stopping the same, except where otherwise specified, is similar to that set out in my former patent.

In the accompanying drawings, A designates the body of the cable-car, from which depend the hangers $a$, braced by the rods $a'$, and perforated at their bottom to receive the rods $a^2$, suitably connected to the car-frame. These rods $a^2$ pass through the flanges $b$, cast on the outer sides of the journal-box frames B, and carry the spiral springs $a^3$, upon which the car-body is sustained. The journal-box frames B, which constitute a portion of the main frame that supports the pulley of the endless band, are shown in the drawings as formed integral with the journal-boxes B', although it will be readily understood that they may be formed of separate pieces connected thereto in any suitable manner. These box-frames are also shown as in one piece with the forward curved portion, B², of the main supporting-frame; but, if desired, the parts may be formed separately and suitably bolted together.

Between the journal-box frames B, on each side of the car, extend the side bars, B³, of the main frame, which are securely bolted to the box-frames, as shown at $b'$ of the drawings, Figs. 2 and 4. The forward curved portions, B², at each end of the main supporting-frame, are provided with the perforated ends $b^2$, which carry the bolt $b^3$, Fig. 11, that sustains the sprocket drum or pulley C, over which passes the endless chain or band D, provided with the projecting arms $d$, which are hinged to the chain, as shown, by means of pivot-pins, which enter the lugs $d^2$ of the chain. The bolt $b^3$ is held in place by the nut $b^4$, and over this bolt, as shown in Fig. 11, fits the sleeve $b^5$, upon which is loosely journaled the sprocket drum or wheel C. The sleeve $b^5$ is provided with the shoulder $b^6$, against which abuts the journal-hub $e$, held on the sleeve, and from which extend the guide-supporting arms E E' E², and against the end of the sleeve, and encircling the bolt $b^3$, is held the hub $e'$, from which project the guide-supporting arms E³ and E⁴. The sprocket drums or wheels C, preferably of polygonal shape, with faces corresponding in length to the links of the endless chain, are provided with the guide-flanges $c$, having grooves or indentations $c'$ therein, Fig. 5, adapted to receive the friction-rollers $d$, Fig. 10, the function of which will hereinafter appear, which project laterally from the ends of such links of the chain as support projecting arms. The projecting arms $d$ are preferably three in number, placed at equal distances apart on the chain, and, as clearly shown in detail, Fig. 9, are made much narrower at their points than their bases, since by this construction the delivery of the arms to the slot of the cable-tube is rendered more certain, while at the same time a sufficient thickness of metal is retained at the part subject to the greatest strain. Connected to each of the sprocket-drums, or formed integral therewith, as shown in the drawings, is the round smooth-faced friction-hub C', over which passes the friction-strap D', the operation of which will be hereinafter described. The guide-supporting arms E and E³ are connected together by the block $e^2$, here shown, Fig. 6, as formed integral with said arms, but which may be formed separate therefrom, and be attached thereto in suitable manner. These arms E and E³ serve to sustain the lower guide, F, which is bolted to the block $e^2$, and is also connected by the brace-rods $f$, Fig. 4, with the side bars, B², of the main frame. This lower guide, F, consists of the long flat tube, the bottom of which is slotted, to permit the passage of the arms projecting from the endless belt, and prevents their lateral movement, and the ends of this guide are provided with the downwardly-flaring mouths, to secure the more accurate and easy entrance into the guide of the chain-links, and friction-rollers, projecting laterally from the endless chain. The arms E', E², and E⁴ support the curved upper guide, G, the top plate, $g$, of which, extending from end to end of the car, is bolted to the arm E⁴ and to the angular bracket $e^3$ on the end of the arm E², Fig, 3, and the bottom plate, $g'$, of which is bolted to the arm E' and to the bracket $e^3$, a short distance beyond which it terminates.

At each end of the lower guide, F, is carried an extension, F', which is hinged at the end of the block $e^2$, as shown in Fig. 6, by means of the plate $e^5$, which carries the bolt $e^6$, on which the end of the extension is held between the washer $e^7$ and the washer and pin $e^8$, Fig. 8. The front end of the extension F' is curved inwardly, as shown in Fig. 6, and to it is bolted, as at $f^2$, the side piece, $f^3$. The ends of the extension F' and the side piece, $f^3$, are provided with the housings $f^4$, in which are held the spring-seated bearings $f^5$, Fig. 4, which receive the journals of the guide-wheel F², provided with the circumferential rib, adapted to enter the slot of the tube in which travels the endless cable. By thus providing the guide-wheels with spring-seated bearings, a slight movement is allowed thereto without jarring the guide-frame. To the inner sides of the extension F' and of the side piece, $f^3$, are attached the supplemental guide-lips F³, which are flared at their ends, and extend in proximity to the cable-tube and to the lower flaring end of the upper guide.

Upon the block $e^2$, as shown in detail, Figs. 5 and 6, is mounted the journal-plate $e^{10}$, having standards $e^{11}$, through which passes the bolt $e^{12}$, on which is pivotally mounted the link $e^{13}$, connected to one end of the friction-strap D', and the elbow-lever $e^{14}$, having its shorter arm attached to the other end of the friction-strap, and having its long arm connected by the link $e^{15}$ to the rod $h$, which is secured to the main lever H. This main lever is supported pivotally upon the standard H', bolted to the top of the lower guide, and from it extend the rods $h'$, which serve to operate the brake-beams I and the rods $h^2$, which connect with the brake-posts of the car through the chains $h^3$, which are wound upon said posts in reverse manner. It will be noted that the several rods are so relatively attached to the main lever H that by moving this lever in one direction, as by turning either of the brake-posts toward the left, it will serve to clamp each of the friction-straps upon their hubs and arrest the sprocket-drums, at the same time lifting the brakes from off the wheels, and by moving the main lever in the opposite direction the friction-straps will be loosened and the brakes will be drawn down upon the wheels, and so arrest their rotation. The brake-beams I are suspended from the main frame, which supports the sprocket-drums, by means of the links I', Fig. 5, which are pivotally connected to the inner sides of the main frame, as shown at $i$.

The operation of the above-described mechanism is, in general, the same as that described in my former patent. When it is desired to impart motion to the car, either winding-post of the car is turned, and the friction-clutch is applied in such manner as to gradually lock the sprocket-drums, so that the projecting arm that is in the slot of the cable-tube will be caught by a truck of the cable and the car will be moved forward. In order to stop the car, the winding-post is turned in reverse direction until the friction-clutch is loosened, the sprocket-drums are free to rotate, and the brakes are applied to the running-wheels. It will be readily understood that when the car is at a standstill the projecting arms are caught successively by the cable-trucks and are moved freely, being guided into the slot of the tube by the hinged extensions of the lower guideway, and being turned downward, as they pass beneath the car, by the curved portions of the upper guides. As the chain carrying the projecting arms moves over its sprocket-drums, the laterally-projecting friction-rollers enter the grooves in the flanges of said drums, and when one of the arms is within the lower guide these rollers serve to avoid the friction occasioned by the pressure of the cable-trucks against each arm.

It will be noticed in my present invention as of especial importance that by sustaining the sprocket-drums the mechanism for arresting the movement of the same, the guide mechanism, and the brake-beams by the main supporting-frame not only is the weight of these several parts borne upon the axle-journals, at which point the axle will be subjected to the least friction, but by this construction, also, it becomes possible to increase to a very great extent the length of the endless chain, and consequently the distance between its projecting arms and the corresponding distance between the supporting-trucks of the cable.

When a car is traversing a curve in the roadway, it is desirable, in order to prevent breakage of parts, that the projecting arm, which is at such time in the cable-tube, should be beneath the center of the car. In order to enable the operator to properly position such projecting arm, I have provided the mechanism illustrated in detail in Figs. 12 and 13, and shown as applied to the car in Figs. 2, 4, and 5. To the upper side of the lower guide, F, and on each side of the main lever, is attached a journal-plate, O, having lugs $o$, which receive the bolt $o'$, upon which is journaled the elbow-lever O'. To the lower arm of this elbow-lever is pivotally connected the bar O², carrying the pins $o^2$, which pass through perforations formed in the guide to receive them. These pins $o^2$ are arranged at a distance apart somewhat greater than the width of the endless chain, which carries the projecting arms, so that when in the guide, as shown in Fig. 12, they will strike the friction-rollers projecting laterally from such links of the chain as carry projecting arms, and arrest the movement of the arm that is in the cable-tube at a point beneath the center of the car. The elbow-lever O' is furnished with a knuckle, $o^3$, to limit its backward movement, and to its short arm is connected the link $o^4$, joined to the rod $o^5$, which is attached to the lever $O^3$, keyed to the end of the turning post $O^4$, that is operated by means of the hand-crank $o^6$.

From the foregoing construction it will be seen that as the car nears a curve the operator turns the crank $o^6$ in such manner as to project the pins $o^2$ into and through the guide F, and by loosening gradually the friction-clutch allows the projecting arms to move until the link, upon which is mounted the arm that is in the lower guide, strikes the pins and comes to rest beneath the center of the car.

I shall now proceed to describe the improvements in the clamps for attaching the trucks to the endless cable, the cable-tube, and the wheels or drums, which, for convenience of description, I designate the "terminal drums," over which the cable passes when its direction of travel is to be changed as at the end of the road or corners of streets where the road turns.

The endless cable L is supported upon the trucks M, each of which consists of an axle, $m$, upon one end of which is fixed the wheel M' by a key, $m'$, or by shrinking it on the axle, and on the opposite end of which is loosely journaled the wheel $M^2$, held in place by a suitable shoulder, $m^2$, on the end of the axle. My object in thus attaching the truck-wheels to the axles is to avoid as much as possible the friction or tendency of the wheels to bind upon the upper rails of the cable-tube by reason of any twisting action of the cable, or when the trucks are passing around a curve. The clamp N, by which the trucks are connected to the cable, is formed preferably of a single piece of soft cast-steel, having the tubular body $n$, which fits over the cable, the side flanges, $n'$ and $n^2$, through which pass the clamping-bolts $n^3$, and projecting from the flange $n'$, the sleeve $n^4$, through which passes the axle of the trucks. The flange $n^2$ is cut away, as shown, above the sleeve $n^4$. By placing the tubular body of the clamp above the axles of the trucks, the cable is brought nearer the surface of the cable-tube, thus leaving greater space wherein it may sag without wearing against the bottom of the tube.

In the cable-tube of my former patent the bottom rails, upon which the cable-trucks traveled, were shown as formed integral with the side plates of the tube. By my present invention the cable-tube T, which is spiked to the cross-ties of the track, consists of a bottom plate, T', upon which are formed, preferably by rolling, the bottom rails, $t$, and which has outer flanges, $t'$, to which are bolted the bottom flanges, $t^2$, of the side plates, $T^2$, upon which are formed the upper rails, $t^3$, and the top flanges, $t^4$, which constitute the cover of the tube, and are such distance apart as to form the slot $t^5$ of the tube. By forming the rails $t$ upon the bottom plate they can be more readily rolled, and, serving as braces against the side plates, $T^2$, make the joint between the bottom and side plates more secure. In the present case, as in my Patent No. 266,645, the cable-trucks are presented in inverted position to each of the terminal drums or wheels V which is in horizontal position by twisting the rails of the cable-tube; but provision is here made for the more accurate guidance of the trucks to such drums. As seen in Fig. 17, the upper rails, $t^3$, of the tube are extended, and are twisted as they approach the wheel V, and the ends of these rails enter the peripheral grooves $v$, adapted to receive the wheels of the cable-trucks. The lower rails, $t$, are extended beyond the center of the terminal drum, so as to guide the truck-wheels until they are within the grooves, and are there held by the tension of the cable. The terminal drum V is also furnished with a peripheral groove, $v'$, adapted to receive the truck-clamps, the upper surfaces of which are concaved to correspond with the periphery of the drum. The rim of the drum V is preferably formed of the flanged side plates, $v'$, bolted to the center rim, $v^2$, in such manner as to form the grooves $v$, and from the center rim, and preferably cast integral therewith, extend the spokes of the drum. The axle X, upon which is loosely journaled the terminal drum, is carried by the slide-plate X', the edges $x$ of which move in the guideways formed by the flanges $x'$ of the fixed plate $X^2$. An adjusting-screw, $X^3$, which passes through the ends $x^2$ of the fixed plate, enters the threaded nut $x^3$ on the under side of the slide-plate, and serves to move said slide-plate and terminal drum, and thus adjust the tension of the cable at its terminals. The hub of the drum X is provided, as shown, with the sectional journal-blocks $x^4$, which may be adjusted by means of the set-screws $x^5$, in order to secure the accurate centering of the drum. Although only one of the cable-tubes is illustrated in connection with the terminal drum, it will be understood that upon the opposite side of the drum the cable-tube of the adjoining track will be arranged in like manner.

In Figs. 20 to $22^a$ of the drawings is illustrated the improved apparatus for transferring the cars around abrupt curves of the roadway and changing the direction of travel of the main cable at such points. At a point slightly in advance of the beginning of the curve the main-cable tube T is depressed, as from a point, 5, so that the arm projecting from the car will be freed from the propelling-trucks of the main cable, which is led in a straightforward direction through the inclined twisted portion 6 of the main tube, that serves to present the trucks in vertical position to the drum V, around which the main cable passes, and which is similar in construction to the terminal drum heretofore described. From the drum V the cable proceeds in its new direction of travel, entering first a twisted portion, 7, of the main tube, which restores the trucks to a horizontal position, and which rises gradually to the level of the roadway at a point, 8, slightly beyond the end of the curve. At points beneath the road-bed, without the main-cable tube, and at short distances in front of and beyond the beginning and end of the curve, are placed, respectively, the drums W and W', held upon suitable journal-standards in vertical position. These drums W and W' are of smaller diameter but of similar construction to the drum V, and serve to carry the supplemental cable L', by means of which the cars are transferred around the curve, as will presently appear. This supplemental cable travels in the upper and lower supplemental tubes P and P', which extend between the drums W and W', and have the central curved portions, $p$, and the straight ends $p'$. The lower tube, P', is upon a plane throughout its entire length, while the curved portion only of the upper tube is upon the level of the road-bed, its straight ends being depressed from the points 9 and 10, and passing beneath the main-cable tube. The straight ends of the tubes P and P' are twisted, as shown, in order to properly deliver the supplemental-cable trucks to the drums. The trucks of the supplemental cable are similar in general construction to those of the main cable, already described. The supplemental cable, however, is supported beneath its trucks, and these are provided each with a propelling-arm, $r$, formed integral with or connected to the sleeve of the clamp through which the truck-axle passes. The curved portions of the tubes P P' consist each of the bottom plate $P^2$, to which are bolted the side plates $P^3$ and $P^4$, having bottom flanges, $p^2$, and top flanges, $p^3$, which in the tube P are separated a sufficient distance to form a slot for the passage of the arm projecting from the car.

Upon the bottom and side plates, $P^2$, $P^3$, and $P^4$, are formed, respectively, the rails $p^4$, $p^5$, $p^6$, and $p^7$, in which, as shown in Fig. 21$^a$, travel the wheels of the supplemental-cable trucks, held in oblique position. The concaved side plates $P^4$ of the tubes are provided with the enlargements Q, which serve to give greater space for the movement of the cable without danger of wearing against the sides of the tubes. To the curved portions $p$ of the tubes P and P' are connected the straight ends of these tubes $p'$, which consist of the bottom plates $p^8$, to which are bolted the side plates having top and bottom flanges, $p^9$ and $p^{10}$, and interior rails $p^{11}$. The portions of these ends next the curved parts of the tubes P P' are twisted a sufficient distance to receive the trucks from the curved tubes and conduct them in horizontal position to the drums. The top plates of the main and of the upper supplemental-cable tubes are joined together, so as to form a continuous slot for the passage of the arm projecting from the car; but between the points 5 and 9, 10 and 8, as will be seen, the car must travel by its acquired momentum, its arms having been released from the trucks of one depressed cable, and not having been acted on by those of the other. The main and supplemental cable tubes are provided at the beginning of their depressed portions, as shown in Fig. 21, with the movable rails R, which are held together by the frame $r^2$ and by the frame $r^3$, pivoted, as at 12, to the sides of the tubes. Beneath the lower set of these movable rails are placed the springs R', which keep the movable rails normally in line with the fixed rails of the tubes, and the tubes are enlarged below the movable rails to permit of their depression. My object in providing the arrangement of movable rails shown is to prevent the lifting of the car and possible breakage of parts or derailment in case the end of the arm projecting from the car, as it passes from one cable to another, should be caught on the top of a truck moving up an inclined portion of the tube. Thus, for example, if the arm projecting from the car after leaving the main cable, and when about to be caught by the supplemental cable, should be struck squarely upon the end by one of the trucks ascending the inclined portion of the tube, the movable rails would yield, allowing the truck to slip from beneath the arm without lifting the car. The drum V is held, as shown, in a pit beneath the roadway, and in a slightly oblique plane of rotation. Keyed to the shaft of this drum is the bevel-gear wheel $W^2$, from which motion is communicated to the drum W' through the bevel-gear wheels $W^3$ and $W^4$, the shaft $W^5$, and bevel-gear wheels $W^6$ and $W^7$, the latter being keyed to the axle of the drum W'.

From the above-described construction it will be seen that when the car has left the main cable it passes above the curved tube, and its arm, entering the slot of such tube, is caught by the propelling-arm of one of the trucks of the supplemental cable, which carries the car around the curves, from which it passes again to the main truck, and is caught by the truck of the main cable. The arrangement of the driving mechanism between the drums V and W' is such as to impart to the supplemental cable preferably a slower rate of speed than that of the main cable.

By the above-described apparatus effective provision is made for changing the direction of travel of the main cable at abrupt curves of the roadway, and for conducting the car around such curves.

In Figs. 23, 24, and 25 of the drawings is illustrated the driving mechanism, whereby motion is communicated to the traction-cable, and in connection therewith is shown the adjustable tension-wheel, whereby a uniform tension of the cable is maintained. S and S' designate the two grooved drums of the driving mechanism, which are similar in construction to the terminal drum heretofore described. These drums S and S' are placed out of alignment with each other in the plane of rotation, as clearly shown in Fig. 24, and motion is imparted to one of the drums in suitable manner from the driving-shaft of the engine. The main cable and its connected trucks are led to the drum S by the rails s, which deliver the trucks and cable into the grooves of the drum. From the drum S the cable passes through the guide-rails s', the central portion of which is bent, as shown at s², Fig. 24, to the drum S', from which it passes through the guide-rails s³ to the tension-drum Y, which is grooved upon its periphery similarly to the terminal drum heretofore described. This drum Y is journaled in the slide-boxes y, which move in the tracks y', and are operated by the long screws y², passing through the ends of said tracks. By the above-described construction of driving mechanism a more effectual frictional contact is had between the drums and the cable than would be possible were a single driving-drum employed, and by means of the drum Y the tension of the cable and its contact upon the driving-drums can be maintained uniform.

In Figs. 26, 27, 28, 29, and 30 of the drawings is shown the improved apparatus for removing the dirt from the cable-tube at suitable points of the road-bed, the bottom plates T' of each of the cable-tubes T are provided with openings u, through which dirt may pass through the branch pipes U, which connect with the main trap U', located centrally between the car-tracks. This trap U' consists of a square body having a slightly-contracted top, u', Fig. 26, over which is fitted the lid or cover u², and having at one side a discharge-opening, u³, which connects with a suitable pipe, U², leading into the sewer. The opening u³ is covered by the bottomless hood u⁴, beneath which water can pass, but which serves to arrest the dirt, which will be removed through the man-hole or top of the trap by a suitable scraper, U⁴. By locating the trap between the tracks, as shown, it serves to collect the dirt from both tubes, and is in a less exposed position than were it upon either side. In order to insure the discharge of all the dirt from the scrapers connected to the moving cable, I place at the front edge of the opening u a dump-block, u⁵, against which the scrapers u⁶, which are attached to some of the cable-trucks, will strike, thereby causing the dirt and mud to fall from the scraper into the opening u.

In the modification shown in Figs. 28 and 29 the trap U is made of considerable depth and of oblong shape, and the branch pipes U, which extend downward, project their lower edges beyond the inner wall of the trap in such manner as to discharge the dirt from the tubes into the pail placed in the bottom of the trap. Near the bottom of the trap is formed the discharge-opening, which leads to the pipe connecting with the sewer.

It will be understood from the foregoing description that it will be advantageous to locate the dirt-reservoir and man-hole between the tracks even when but one of the tubes is discharged therein, since, as stated, in this position it is less exposed than were it without the tracks.

Having thus described my invention, what I claim as new, and desire to secure by Letters Patent, is—

1. In a cable-railway car, the combination, with a series of projecting arms adapted to be brought successively into the slot of a cable-tube and mechanism for carrying the same, of a supporting-frame for sustaining said mechanism, substantially as described.

2. The combination, in a cable-railway car, of an endless chain or band provided with projecting arms for connection with the cable, drums or pulleys for carrying said chain or band, and a frame for supporting said drums or pulleys, substantially as described.

3. In a cable-railway car, the combination of an endless chain or band provided with projecting arms for connection with the cable, drums or pulleys for carrying said chain or band, and a frame for supporting said drums or pulleys, sustained upon the axles of the car, substantially as described.

4. In a cable-railway car, the combination of an endless chain or band provided with projecting arms for connection with the cable, of drums or pulleys for carrying said chain or band, and a frame for supporting said drums or pulleys, sustained upon the journals of the car-axles, and extending beyond said axles, substantially as described.

5. In a cable-railway car, the combination, with a series of projecting arms for connection with the cable, of mechanism for carrying said arms, a frame for supporting said mechanism, and guide mechanism for said projecting arms, sustained by said frame, substantially as described.

6. In a cable-railway car, the combination, with an endless chain having projecting arms and the drums or pulleys for said chain, of a main supporting-frame connected with the journal-boxes of the car-axles, and having curved extensions and a series of supporting-arms for sustaining the guide mechanism, substantially as described.

7. In a cable-railway car, the combination, with projecting arms for connection with the cable, of mechanism for arresting the movement of said arms, consisting, essentially, of a friction-hub, a strap encircling said hub, and having one end fixed, an elbow-lever connected to the other end of said strap, and means for operating said lever, substantially as described.

8. In a cable-railway car, the combination of an endless band or chain, provided with projecting arms for connection with the cable, of drums or pulleys for sustaining said band or chain, friction-hubs connected with said drums or pulleys, friction-straps encircling said hubs, elbow-levers for clamping said straps, a main lever for operating said elbow-levers, and means for connecting said main lever to the winding-post of the car, substantially as described.

9. In a cable-railway car, the combination, with the projecting arms for connection with the cable, of the upper and lower guide and the hinged extensions provided with the supplemental guide-lips, substantially as described.

10. In a cable-railway car, the combination, with the lower fixed guide, of the hinged guides placed at one side of said fixed guide, and having their forward ends extending in front of the same, substantially as described.

11. In a cable-railway car, the combination, with the hinged extensions, of the spring-seated guide-wheels, substantially as described.

12. In a cable-railway car, the combination, with the endless chain carrying the projecting arms, of the lower fixed guide, having expanded mouths to receive said projecting arms, substantially as described.

13. In a cable-railway car, the combination, with the main frame for sustaining on the car-axle journals the mechanism for attaching the car with a moving cable, of brake-beams pivotally connected to said main frame, substantially as described.

14. In a cable-railway car, the combination of mechanism provided with projecting arms for attaching a car to a moving cable, guide mechanism for said arms, mechanism for arresting the movement of said arms, and a main frame for sustaining said several mechanisms, supported upon the journals of the car-axle, substantially as described.

15. In a cable-railway car, the combination, with the endless chain or band, of projecting arms and friction-rollers extending laterally from said chain at each side of said arms, substantially as described.

16. In a cable-railway car, the combination, with an endless chain or band having projecting arms, and having at the base of said arms rollers extending laterally from said band or chain, of supporting drums or pulleys having flanges provided with grooves or sockets to receive said rollers, substantially as described.

17. In a cable-railway car, the combination, with the endless chain or band, of projecting arms of decreasing thickness toward their points, substantially as described.

18. In a cable-railway car, the combination, with movable arms for connection with a cable, of mechanism for locating in desired position one of said movable arms beneath the bottom of the car, substantially as described.

19. In a cable-railway car, the combination, with an endless chain or band carrying projecting arms for connection with a moving cable, of mechanism for arresting the movement of said arms and mechanism, substantially as described, for locating in desired position one of said arms beneath the center of the car, substantially as set forth.

20. In a cable-railway car, the combination, with an endless chain or band carrying projecting arms for connection with a moving cable, and having rollers or stops thereon, of pins for engagement with said stops, a lever for moving said pins, and mechanism extending to the end of the car for operating said lever, substantially as described.

21. In a cable-railway car, the combination, with the endless chain carrying projecting arms for connection with a moving cable, of two levers with pins for locating a projecting arm beneath the center of the car, and mechanism at each end of the car for operating one of said levers, substantially as described.

22. The combination, with a cable-clamp having a tubular body portion, and having flanges adapted to be bolted together, of a stop or truck the axle of which passes through said flanges, substantially as described.

23. A clamp for attaching trucks to a cable having bottom flanges one of which is provided with a bearing for the axle of the trucks, substantially as described.

24. A clamp for attaching trucks to a cable, having a tubular body with curved upper surface, bottom flanges adapted to receive clamping-bolts, and a sleeve adapted to fit over the truck-axle, substantially as described.

25. In cable-railway apparatus, the combination, with the cable, of supporting-trucks having clamping mechanism above their axles for sustaining the cable, substantially as described.

26. In cable-railway apparatus, the combination, with the cable, of a truck for sustaining the cable, having upon its axle a loose and a fixed wheel, substantially as described.

27. In cable-railway apparatus, a cable-tube having a separate bottom plate, with rails formed integral therewith, substantially as described.

28. In cable-railway apparatus, a cable-tube having a bottom plate with rails thereon, and having side plates with rails, substantially as described.

29. In cable-railway apparatus, a drum for changing the direction of travel of the cable, having a grooved central rim and flanged side plates attached thereto in such manner as to form peripheral grooves, substantially as described.

30. In cable-railway apparatus, the combination, with the grooved drum, of the twisted tube-rails, one set arranged in proximity to the periphery of said drum and the other set extending beyond the point where the cable engages with said drum, substantially as described.

31. In cable-railway apparatus, the combination, with the sections of the main-cable tube arranged at angles at curves of the roadway, of a supplemental cable having stops or trucks thereon, and a curved tube for said supplemental cable, the stops or trucks of said supplemental cable being arranged to travel beneath the slot of the curved tube, substantially as described.

32. In cable-railway apparatus, the combination, with sections of the main-cable tube arranged at an angle to each other and having portions depressed, of a curved supplemental tube extending between said sections, and having at each end a depressed portion, and a supplemental cable having stops or trucks, and having terminal drums driven from the main cable, substantially as described.

33. In cable-railway apparatus, the combination, with the traction-cable, of sections of the cable-tube having each a depressed end, and arranged at an angle to each other at a curve of the roadway, and a drum for the cable placed in the angle, substantially as described.

34. In cable-railway apparatus, the combination, with the main traction-cable, of sections of the main-cable tube having each a depressed portion, and arranged at an angle to each other, a drum located in said angle for changing the direction of travel of the main cable, a curved supplemental-cable tube, a supplemental cable, terminal drums for said supplemental cable, and gear mechanism connecting one of said terminal drums with the drum of the main cable, substantially as described.

35. In cable-railway apparatus, the combination, with the cable, its supporting-trucks, and its tube, of movable rails, substantially as described.

36. In cable-railway apparatus, the combination, with the cable having stops or trucks thereon, and depressed portions of the cable-tube, of spring-seated movable rails, substantially as described.

37. In cable-railway apparatus, the combination, with intersecting cable-tubes, of movable rails in said tubes at the points of intersection, substantially as described.

38. In cable-railway apparatus, the combination, with the cable having trucks thereon, and the main and supplemental tubes of the curves of the roadway, of the movable rails placed in said tubes at the beginning and end of the curves, substantially as described.

39. A curved supplemental-cable tube for curves of a cable-roadway having upon its top and bottom rails or bearings for the wheels of small trucks, and having an extension or enlargement upon its concaved side, substantially as described.

40. The combination, with a car having an arm adapted to be projected into and withdrawn from the slot of a cable-tube, of a supplemental cable for the curves of cable-roadways having stops or trucks provided with projecting arms, substantially as described.

41. In cable-railway apparatus, the cable-driving mechanism comprising two grooved wheels having guides between the same for the cable, substantially as described.

42. In cable-railway apparatus, the cable-driving mechanism consisting of two grooved wheels arranged out of alignment with each other, in combination with the twisted guides for the cable-trucks, substantially as described.

43. In cable-railway apparatus, the combination, with the driving mechanism, of the grooved adjustable tension-drum and guide-rails leading therefrom to the driving mechanism, substantially as described.

44. In cable-railway apparatus, the combination, with the cable-tube having dirt-discharge openings therein, of dump-blocks on the edge of said openings, substantially as described.

45. In cable-railway apparatus, the combination, with adjoining cable-tubes having dirt-discharge openings therein, of dirt traps or reservoirs located between said tubes, and branch pipes extending from each of said tubes to the reservoir, substantially as described.

46. In cable-railway apparatus, the combination, with the adjoining cable-tubes having dirt-discharge openings therein, of dirt traps or reservoirs located between said tubes, and having man-holes and pipes leading to a sewer, and branch pipes connecting with each of said cable-tubes, said branch pipes having bottoms projecting a short distance within said reservoirs, substantially as described.

In testimony whereof I have hereunto set my hand this 19th day of March, A. D. 1883.

CHARLES W. RASMUSEN.

In presence of—
  GEORGE P. FISHER, Jr.,
  JAMES H. PEIRCE.